United States Patent
Petcherski et al.

(10) Patent No.: US 9,218,369 B2
(45) Date of Patent: *Dec. 22, 2015

(54) RANKING IMAGE SEARCH RESULTS USING HOVER DATA

(71) Applicant: Google Inc., Mountain View, CA (US)

(72) Inventors: Alexandre Petcherski, San Francisco, CA (US); Michihiro Kuramochi, Palo Alto, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,446

(22) Filed: Jul. 29, 2014

(65) Prior Publication Data

US 2015/0169639 A1    Jun. 18, 2015

Related U.S. Application Data

(63) Continuation of application No. 13/585,894, filed on Aug. 15, 2012, now Pat. No. 8,819,004.

(51) Int. Cl.
*G06F 17/30* (2006.01)

(52) U.S. Cl.
CPC .......... *G06F 17/30265* (2013.01); *G06F 17/30* (2013.01); *G06F 17/30864* (2013.01)

(58) Field of Classification Search
None
See application file for complete search history.

(56) References Cited

U.S. PATENT DOCUMENTS

| 2005/0120311 A1 | 6/2005 | Thrall |
| 2012/0203757 A1 | 8/2012 | Ravindran |

*Primary Examiner* — Robert Beausoliel, Jr.
*Assistant Examiner* — Hau H Hoang
(74) *Attorney, Agent, or Firm* — Fish & Richardson P.C.

(57) ABSTRACT

Methods, systems, and apparatus, including computer programs encoded on a computer storage medium, for ranking images using hover data. In one aspect, a method includes determining a click count and a hover count for an image and a search query pair. The click count specifies a number of times that an image search result that includes a representation of the image has been selected when provided in response to the search query. The hover count specifies a number of times that the representation of the image has been hovered over when the image search result has been provided in response to the search query. A quality measure for the image with respect to the search query is determined. The quality measure is based on the click count and the hover count. A ranking of the image is adjusted for the search query based on the quality measure for the image.

18 Claims, 7 Drawing Sheets

RANKING IMAGE SEARCH RESULTS USING HOVER DATA

CROSS-REFERENCE TO RELATED APPLICATIONS

This application is a continuation application of, and claims priority to, U.S. patent application Ser. No. 13/585,894, entitled "Ranking Image Search Results Using Hover Data," filed on Aug. 15, 2012. The disclosure of the foregoing application is incorporated herein by reference in its entirety for all purposes.

BACKGROUND

This specification relates to information retrieval.

The Internet provides access to a wide variety of resources, such as image files, audio files, video files, and web pages. A search system can identify resources in response to queries. The queries can be text queries that include one or more search terms or phrases, image queries that include images, or a combination of text and image queries. The search system ranks the resources and provides search results that link to the identified resources. The search results are typically ordered for viewing according to the rank.

The search system may also rank resources based on the performance of the resource with respect to the particular query. For example, some conventional search systems rank resources having a high click-through rate for the particular query higher than resources having a lower click-through rate for the particular query. The general assumption under such an approach is that queries are often an incomplete expression of the information needed, and the user's action of clicking on a particular resource is a signal that the resource is at least as responsive to, or more responsive to, the user's informational need that the other identified resources.

SUMMARY

In general, some innovative aspects of the subject matter described in this specification can be embodied in methods that include the actions of determining a click count for an image and a search query pair, the click count specifying a number of times that an image search result that includes a representation of the image has been selected when provided in response to the search query; determining a hover count for the image and the search query pair, the hover count specifying a number of times that the representation of the image has been hovered over by a cursor when the image search result has been provided in response to the search query; determining a quality measure for the image with respect to the search query, the quality measure being based at least on the click count and the hover count; and adjusting a ranking of the image relative to other images for the search query, the ranking being based on the quality measure for the image. Other embodiments of this aspect include corresponding systems, apparatus, and computer programs, configured to perform the actions of the methods, encoded on computer storage devices.

These and other embodiments can each optionally include one or more of the following features. The hover count can specify the number of times that the representation of the image has been hovered over by a cursor without being selected. The ranking can be further based on corresponding quality measures for each of the other images.

Determining the quality measure for the image with respect to the search query can include: determining a hover weighting for the search query based on a total click count for the search query, the total click count being a total click count for all image and search query pairs that the search query is a member, the hover weighting specifying an amount to adjust the hover count relative to the click count; adjusting the hover count using the hover weighting to generate an adjusted hover count; summing the click count and the adjusted hover count together to generate a total image selection count; and providing the total image selection count as an input to an image ranking process that determines the quality measure using at least the total image selection count.

The hover weighting can be inversely proportional to the total click count for the search query. Determining the hover weighting can include applying a sigmoid function to the total click count for the search query. The sigmoid function can define a range of total click counts for which the hover weighting varies based on the total click count for the search query, the range of total click counts being defined by an upper total click value and a lower total click value. The hover weighting can increase as the total click count for the search query approaches the lower click value. The hover weighting can decrease as the total click count for the search query approaches the upper click value.

Aspects can further include identifying a query hover count for the search query, the query hover count for the search query specifying a total number of hovers for all image and search query pairs that the search query is a member; adjusting the query hover count using the hover weighting to generate an adjusted query hover count; and summing the adjusted query hover count and the total click count for the search query to generate a total query selection count. The total query selection count can be provided as an input to the image ranking process. The image ranking process can determine the quality measure using at least the total image selection count and the total query selection count.

Aspects can further include determining a click to hover ratio for the image and search query pair. The click to hover ratio can be a ratio of the click count to the hover count for the image and search query pair. The quality measure can be based on the click to hover ratio.

Determining the quality measure for the image with respect to the search query can include: providing the click count as an input to an image ranking process that generates an initial quality score for the image and the search query pair based at least on the click count; and adjusting the quality score using the click to hover ratio to determine the quality measure.

Determining the quality measure for the image with respect to the search query can include: determining a demoting factor by applying a sigmoid function to the click to hover ratio; and adjusting the initial quality score using the demoting factor to determine the quality measure. Adjusting the initial quality score using the demoting factor to determine the quality measure can include multiplying the initial quality score by the demoting factor.

Determining the quality measure for the image with respect to the search query can include: obtaining an initial quality score for the image with respect to the search query; determining an impression count for the image and the search query pair, the impression count being a number of times the image search result was provided in response to the search query; determining whether the impression count satisfies a first threshold; and in response to determining that the impression count satisfies the first threshold: determining a total selection count for the image and the search query pair, the total selection count being the sum of the click count and the hover count; determining a click through rate for the image and the search query pair, the click through rate being a ratio of the total selection count to the impression count; determining a click to hover ratio for the image and the search query pair, the click to hover ratio being a ratio of the of the click count to the hover count; and determining the quality measure for the image and the search query pair using the initial quality score, the click through rate, and the click to hover ratio.

A quality measure can be determined by multiplying the initial quality measure by a default value in response to the impression count not satisfying the first threshold. The first threshold can be zero.

Determining the quality measure for the image and the search query pair using the initial quality score, the click through rate, and the click to hover ratio can include: adjusting the click through rate by a first parameter to generate an adjusted click through rate; adjusting the click to hover ratio by a second parameter to generate an adjusted click to hover ratio; multiplying the adjusted click through rate by the adjusted click to hover ratio to generate an intermediate value; adjusting the intermediate value by a third parameter to generate an adjusted intermediate value; and determining the quality measure by determining the product of the adjusted intermediate value and the initial quality score.

The first parameter, the second parameter, and the third parameter can each include a predefined value for adjusting the quality measure to meet an image ranking metric.

Particular embodiments of the subject matter described in this specification can be implemented so as to realize one or more of the following advantages. Search results can be more accurately ordered by using data regarding hovers over search results. Search results that receive a large number of hovers relative to clicks, such as search results that reference click magnet images, can be demoted in search result rankings Hover data can be used to more accurately rank search results for uncommon or unpopular search queries that have little associated selection data. The weighting of hover data for search result rankings can be adjusted based on query popularity such that hovers are weighted less for popular queries than unpopular queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Data regarding hovers can be used to rank or adjust the ranking of search results, such as image search results. Image search results are often presented as reduced-sized representations of the original images that they reference. When a user hovers a pointer, such as a mouse cursor, over an image search result, a larger version of the image may be presented to the user. This hover activity can be seen as a sign of interest in the image and can be used to better rank images.

In some implementations, a system ranks images for a particular query based, at least in part, on a quality measure for each image with respect to the particular query. For example, the images may be ranked based on a measure of relevance of the image for the particular query. This ranking may then be adjusted based on the quality measures for the images with respect to the particular query.

In general, the quality measure for an image with respect to a search query indicates the performance of the image as a search result for the search query. In some implementations, the quality measure for an image with respect to a particular query is based on a total selection count for the image with respect to the search query. The total selection count for an image and search query pair may be based on a click count for the image and search query pair and a hover count for the image and search query pair. The click count specifies the number of times that search results referencing the image have been explicitly selected, e.g., clicked on, when provided in response to the search query. Similarly, the hover count specifies the number of times that search results referencing the image have been hovered over when provided as a search result in response to the search query.

In some implementations, the hover count is weighted relative to the click count in the total selection count computation. For example, the hover count may be weighted based on the popularity of the search query. The popularity of the search query may be based on a total click count for the search query across all image and search query pairs for which the search query is a member. That is, the popularity of the search query may be based on the total number of clicks that image search results have received when provided in response to the search query. Other measures of query popularity may also be used, such as the total number of times the search query has been received.

In some implementations, the quality measure for an image with respect to a search query is determined or adjusted based on a click to hover ratio for the image and search query pair. For example, images that receive a small number of clicks relative to the number of hovers may be demoted as these images may be considered low performing or click magnets that draw a user's attention but does not receive a proportional amount of clicks. In some implementations, an initial quality score for the image is adjusted by a demoting factor, which is based on the click to hover ratio. For example, a sigmoid function may be applied to the click to hover ratio to determine the demoting factor. In turn, the demoting factor can by multiplied by the initial quality score to determine the quality measure for the image.

In some implementations, a click through rate that combines clicks with hovers is used along with the click to hover ratio to adjust the ranking of an image for a particular query. For example, an initial quality score may be multiplied by a factor that is proportional to the product of the click through rate and the click to hover ratio to determine the quality measure. For images that have not been provided responsive to a search query, the quality measure is based on the initial quality score and a default factor, as date for determining a click through rate and click to hover ratio may not be available for the images.

Figure 1:
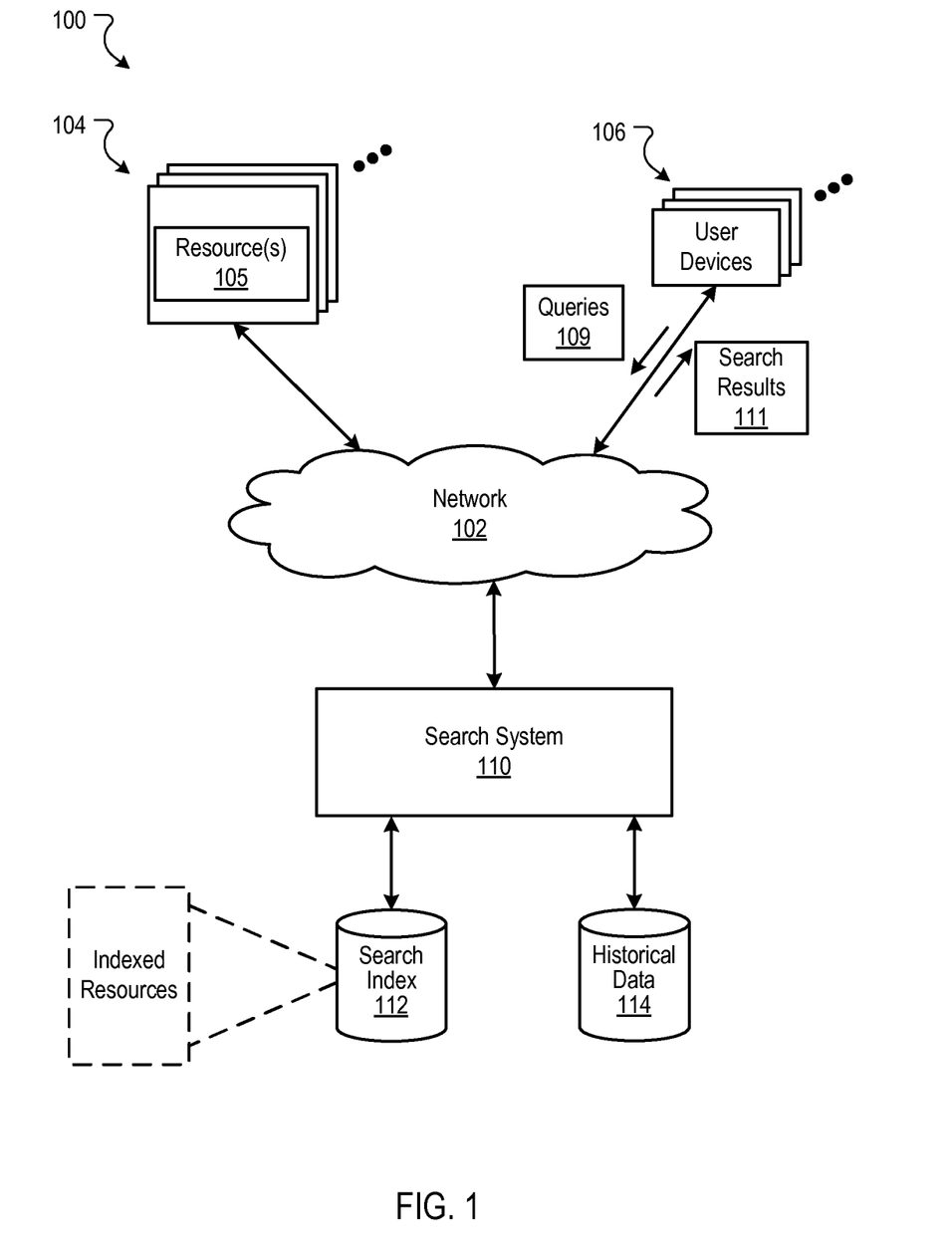
FIG. 1 is a block diagram of an example environment in which a search system provides search services.

FIG. 1 is a block diagram of an example environment 100 in which a search system 110 provides search services. A computer network 102, such as a local area network (LAN), wide area network (WAN), the Internet, a mobile phone network, or a combination thereof, connects web sites 104, user devices 106, and the search system 110. The environment 100 may include many thousands of web sites 104 and user devices 106.

A web site 104 is one or more resources 105 associated with a domain name and hosted by one or more servers. An example web site 104 is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, portable format (PDF) documents, images, video, and feed sources, to name just a few. The resources 105 can include content, such as words, phrases, images, and sound, and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource 105 to which the data corresponds. The indexed and, optionally, cached copies of the resources 105 are stored in a search index 112.

A user device, such as user device 106, can submit a search query 109 to the search system 110. The search system 110 performs a search operation that uses the search query 109 as input to identify resources 105 responsive to the search query 109. For example, the search system 110 may access the search index 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111.

A search result 111 is data generated by the search system 110 that identifies a resource 105 that is responsive to a particular search query 109, and includes a link to the resource 105. An example search result 111 can include a web page title, a snippet of text or an image or portion thereof extracted from the web page, and a hypertext link, e.g., a uniform resource locator (URL), to the web page. An image search result typically includes a representation of the image referenced by the search result, but is often not the referenced image. For example an image search result may include a reduced-sized version of the referenced image, e.g., a thumbnail image, or a cropped version of the referenced image.

The search terms in the search query 109 can control the search results 111 that are identified by the search system 110. Although the actual ranking of the search results 111 varies based on the ranking process used by the search system 110, the search system 110 can retrieve and rank search results 111 based on the search terms submitted through a search query 109.

The user devices 106 receive the search results pages and render the pages for presentation to the users. In response to the user selecting a search result 111 at a user device 106, the user device 106 requests the resource identified by the resource locator included in the search result 111. The web site 104 hosting the resource 105 receives the request for the resource 105 from the user device 106 and provides the resource 105 to the requesting user device 106.

Data for the search queries 109 submitted during user sessions are stored in a data store, such as the historical data store 114. For example, for search queries that 109 are in the form of text, the text of the query is stored in the historical data store 114. For search queries 109 that are in the form of images, an index of the images is stored in the historical data store 114, or, optionally, the image is stored in the historical data store 114.

Selection data specifying actions taken in response to search results 111 provided in response to each search query 109 are also stored in the historical data store 114. These actions can include whether a search result 111 was selected, and for each selection, for which search query 109 the search result 111 was provided. As used herein, an image that is referenced in a search result 111 is considered to be selected when the search result referencing the image is selected, e.g., clicked on by a user or hovered over by a cursor or other pointer under control of a user. The selection data can also specify, for each selection, the type of selection, e.g., click or hover, and for hovers, the amount of time that the cursor hovered over the search result and/or whether the search result was selected after being hovered.

The data stored in the historical data store 114 can be used to map search queries 109 submitted during search sessions to resources 105 that were identified in search results 111 and the actions taken by the users. For example, the data stored in the historical data store 114 can also be used to derive click counts and hover counts for image and search query pairs. The click count for an image and search query pair specifies the number of times that an image search result that include a representation of the image of the image has been clicked on or selected when provided in response to the search query. The hover count for an image and search query pair specifies the number of the times that the representation of the image has been hovered over by a cursor or other pointer when the image search result has been provided in response to the search query. A total selection count for an image and search query pair can be derived by summing the click count and the hover count, or a weighted version of the hover count, for the image and search query pair.

In some implementations, short hovers, e.g., hovers lasting for less than 0.5 seconds, are excluded from the hover count. For example, a short hover may result from a user moving a mouse cursor over several images with the intention of selecting a particular image. These short hovers may not be indicative of the user's interest in the image and thus, may be excluded from the hover count.

Figure 2:
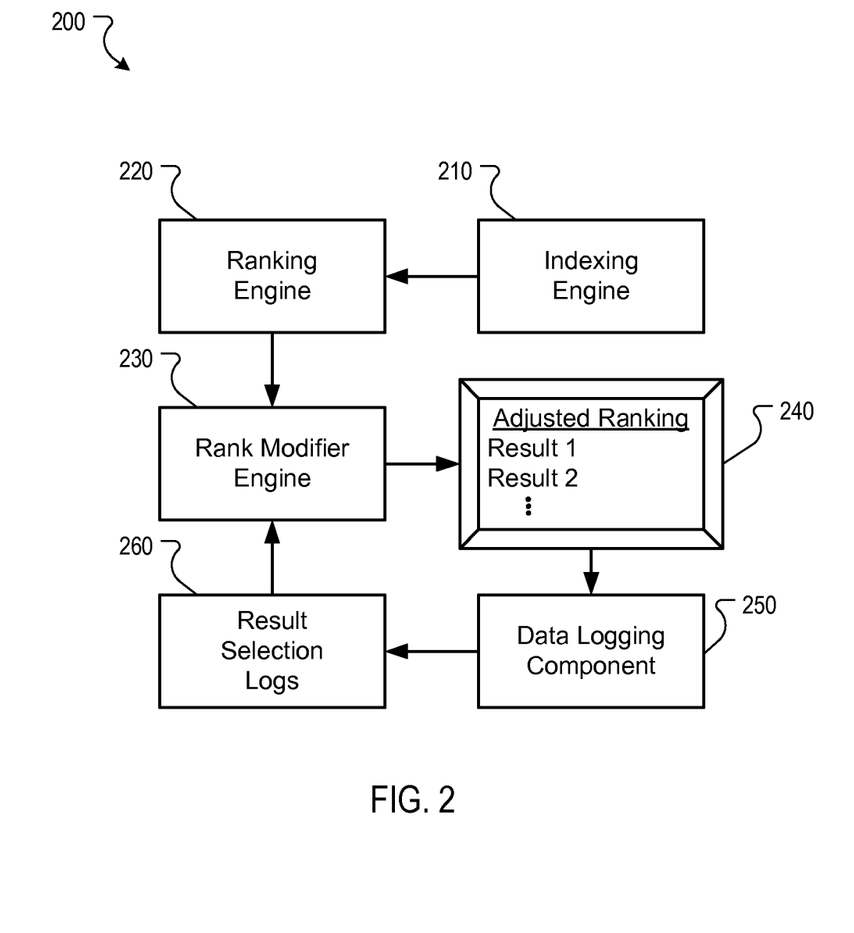
FIG. 2 is a block diagram of example components of a search system.

FIG. 2 is a block diagram of example components of a search system, such as the search system 110. The components include an indexing engine 210, a ranking engine 220, and a rank modifier engine 230. The indexing engine 210 can actively search a corpus, e.g., web pages on the Internet, to index the resources 105 found in the corpus, and the index information for the resources 105 can be stored in the search index 112. The search index 112 can be accessed to identify resources 105 related to search queries 109.

The ranking engine 220 ranks the resources 105 related to a search query 109. For a search directed to text, the search results 111 are typically ranked based on relevance scores related to resources 105 identified by the search results 111, such as information retrieval ("IR") scores, and optionally a score of each resource relative to other resources. In general, the relevance scores are a measure of the relevance of the images to the search query 109. The search results 111 are ordered according to the relevance scores and are provided to the user device 106 according to the order.

The relevance scores for an image can be based on labels that are associated with the image. Labels are text or data flags that indicate a topic to which the image belongs. Labels can be explicitly associated with an image, for example, by the publisher that is providing the image. For example, a publisher can associate the text "basketball" with an image that includes content that is directed to football, e.g., an image of a basketball or a basketball player. Labels can also be explicitly associated with an image by users to whom the image is presented. The labels may be stored in the search index 112 with reference to the corresponding image.

Labels can also be associated with an image based on a relevance feedback score for the image. For example, a label matching a search query 109 can be associated with an image when the image is selected for presentation by the users at a rate that satisfies a threshold selection rate. For example, the rate of selection by the users may satisfy the threshold selection rate by exceeding the threshold selection rate. The threshold selection rate can be specified as a portion of the total search results 111 for the search query 109 in which the image is referenced. In turn, the label can then be used to select the image for reference in search results 111 responsive to future instances of the search query 109.

The relevance score for an image can be based on how well an image label matches the search query 109. For example, an image having a label that is the same as the search query 109 can have a higher relevance score to the search query 109 than an image having a label that is a root of the search query 109 or otherwise matches the search query 109 based on query expansion techniques, e.g., synonym identification or clustering techniques. Similarly, images having labels that match the search query 109 are identified as more relevant to the search query 109 than images that do not have labels matching the search query 109. In turn, images having labels that match the search query 109 may be selected for reference at higher search positions than images that do not have labels that match the search query 109.

To further improve such ranking techniques, the ranking engine 220 can provide information about the ranked images to the rank modifier engine 230. The rank modifier engine 230 can determine, for each image, a quality measure for the image and adjust the ranking of the images based on the quality measures to produce an adjusted ranking 240. As described in more detail below, the quality measure for an image may be based on the click count, hover count, and/or total selection count for the image with respect to search query 109 for which the images are ranked.

A data logging component 250 can be used to record data for search queries and search results provided responsive to the search queries. For example, the data logging component 250 can receive and store selection data for received queries in a result selection log 260, such as the historical data store 114 of FIG. 1. As described above, this selection data can specify actions taken in response to search results provided in response to search queries, such as whether a search result was selected, the type of selection, and an amount of time associated with the selection, e.g., an amount of time that a search result was hovered.

Figure 3:
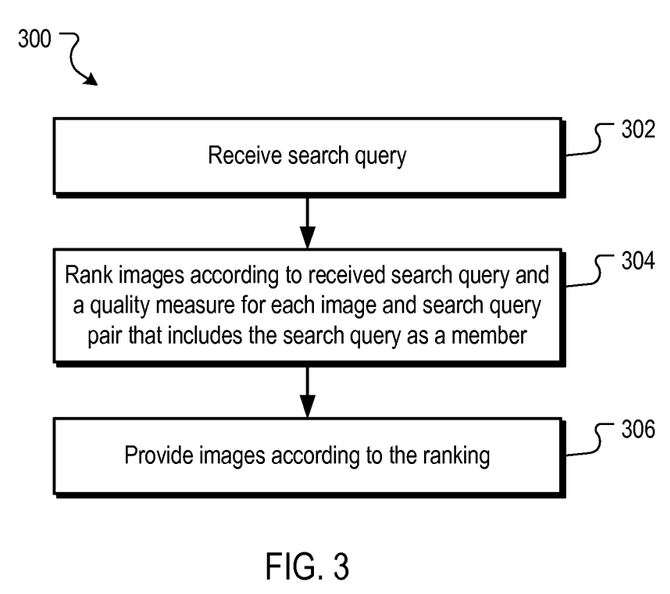
FIG. 3 is a flow chart of an example process for providing image search results in response to a search query.

FIG. 3 is a flow chart of an example process 300 for providing image search results in response to a search query. The process 300 can, for example, be implemented by the search system 110.

Query data defining a search query is received (302). The search query can be, for example, a search query directed to images submitted by a user through a user device 106. The query data can be received, for example, by the search system 110.

Images are ranked based, at least in part, on a quality measure for each image with respect to the received search query. In some implementations, a ranking engine 220 of the search system 110 accesses the search index 112 to identify images that are relevant to the received search query and ranks the images based on a relevance score for each image with respect to the received search query. The ranking engine 220 can provide data regarding the ranked images to a rank modifier engine 230. The provided data may include data identifying the relevant images, data specifying the ranking, and/or data specifying the relevance score for each relevant image.

The rank modifier engine 230 accesses the historical data 114 to identify image and search query pairs for which the search query is a member, and to identify a click count and/or hover count for each identified image and search query pair. Each identified image and search query pair includes as members, the received search query and an image that has been clicked on or hovered over when presented in the form of a search result for the search query. The rank modifier engine 230 may determine a quality measure for each image included in an identified image and search query pair based on the respective click count and/or the hover count for the image and search query pair.

The rank modifier engine 230 can re-rank the images based, at least in part, on the quality measures. In some implementations, the rank modifier engine determines a rank score for each image based on the relevance score for the image with respect to the search query and the quality measure for the image with respect to the search query. For example, the rank modifier engine 230 may determine the rank score for an image by multiplying the relevance score for the image by the quality measure. The rank modifier engine 230 may re-rank the images based on the rank scores to produce an adjusted ranking.

Images are provided according to the adjusted ranking (306). For example, the search system 110 may select a number of the higher ranked images, generate search results that reference the selected images, and provide the search results to the user device 106 that submitted the search query. In turn, the user device 106 can present the search results to the user, for example on a search results page.

Figure 4:
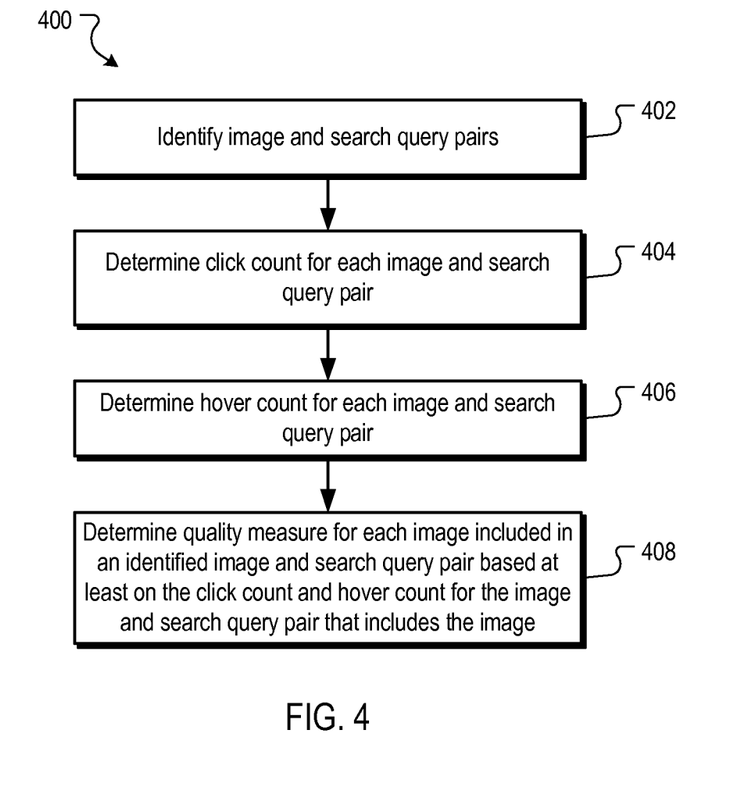
FIG. 4 is a flow chart of an example process for determining quality measures for images with respect to a search query.

FIG. 4 is a flow chart of an example process 400 for determining quality measures for images with respect to a search query. The process can, for example, be implemented by the search system 110.

Image and search query pairs that include a particular search query, such as a search query received from a user, are identified (402). For example, the search system 110 can access the historical data 114 to identify each image that has received a click and/or a hover when presented in the form of a search result in response to the particular search query. Each identified image is included in an image and search query pair with the particular search query.

A click count is determined for each image and search query pair (404). As described above, a click count for an image and search query pair specifies the number of times that image search results that include a representation of the image have been clicked on or selected when provided in response to the search query. The search system 110 can determine the click count for an image and search query pair using click data stored in the historical data 114.

A hover count is determined for each identified image and search query pair (406). As described above, a hover count for an image and search query pair specifies the number of times that the representation of the image—or the search result— has been hovered over by a cursor when the image search result having the representation of the image has been provided in response to the search query. The search system 110 can determine the hover count for an image and search query pair using hover data stored in the historical data 114.

A quality measure is determined for each identified image that is included in one of the identified image and search query pairs (408). For example, the search system 110 can determine the quality measure for each image using the click count and/or the hover count for the image and search query pair that the image is a member. That is, the quality measure for an image with respect to the particular search query can be determined based on the number of clicks and the number of hovers the image received when presented in the form of a search result for the particular search query.

Figure 5:
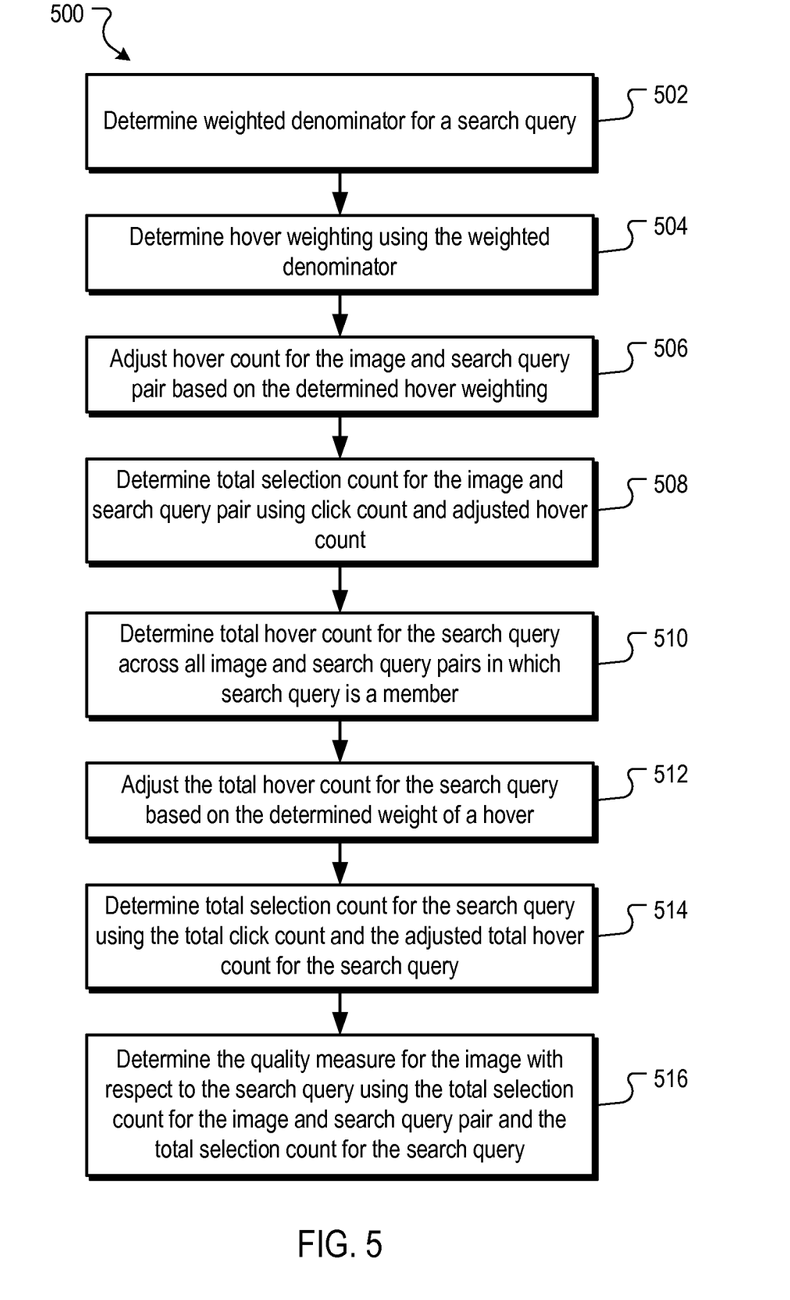
FIG. 5 is a flow chart of an example process for determining a quality measure for an image with respect to a search query.

FIG. 5 is a flow chart of an example process 500 for determining a quality measure for an image with respect to a search query. The process 500 can, for example, be implemented by the search system 110. In the process 500, the quality measure is determined based upon a total selection count for the image when the image is presented in the form of a search result for the search query. For example, the total selection count can be based on a sum of the click count for the image and search query pair and a weighted hover count for the image and search query pair. Treating hover counts as click counts, with some weighting, can improve the ranking of images, especially for search queries for which image search results have not received many selections. For example, there may be little click data available for uncommon queries. By supplementing this data with data regarding images that have been hovered over, the search system 110 can more accurately rank images for the uncommon search queries, as the hover data can indicate images that were of interest to users.

A weighted denominator is determined for the search query (502). In some implementations, the weighted denominator is based on the popularity of the search query. For example, the weighed denominator may be the total number of clicks for the search query across all search results—or all image search results—that have been clicked on when provided for the search query. To illustrate, consider a search query for which ten different image search results were clicked one or more times each, as indicated by the historical data 114 logged for the search query. The search system 110 can determine the number of times each image search result was clicked when provided for the search query and sum these numbers to determine the total number of clicks for the search query.

The weighted denominator can be based on other measures of query popularity. For example, the weighted denominator may be based on, or equal to, the number of times the search query was received by the search system 110 or the frequency of occurrence of the search query.

A hover weighting is determined using the weighted denominator (504). The hover weighting is a factor by which the hover count is adjusted relative to the click count. In some implementations, the search system 110 determines the hover weighting by applying a sigmoid function to the weighted denominator, e.g., $$P(t) = \frac{1}{1 + e^{-t}}$$ Equation 1

Equation 2, shown below, is an example equation for determining the hover weighting using a sigmoid function.

$$\text{Hover Weighting} = \frac{1}{1 + e^{(a*wd-b)}}$$ Equation 2

In Equation 2, "wd" is the weighted denominator for the search query and the parameters "a" and "b" are smoothing coefficients. The values of the smoothing coefficients can be selected to adjust the hover weighting based on the value of the weighted denominator. That is, the values of the smoothing coefficients can be selected to result in target hover weightings for particular click counts. For example, the values of the smoothing coefficients may be selected to achieve a hover weighting of about one for a first click count and a hover weighting of about zero for a second click count. Other values can also be used.

The hover count for the image and search query pair is adjusted based on the hover weighting to produce an adjusted hover count (506). In some implementations, the search system 110 determines the adjusted hover count by multiplying the hover weighting by the hover count for the image and search query pair. For example, if the hover weighting is 0.5 and the hover count is 200, the adjusted hover count would be 100 (0.5*200).

A total selection count for the image and search query pair is determined using the click count and the adjusted hover count for the image and search query pair (508). The total selection count represents a total number of times the image has been selected when provided for the search query, with the hover count being weighted as described above. In some implementations, the search system 110 determines the total selection count by summing the click count and the adjusted hover count.

As the total selection count for the image and search query pair can be based on the adjusted hover count, the popularity of the search query can affect the total selection count. For example, if the search query is popular, for example based on the click count for the search query, then the hover weighting may be low, causing the adjusted hover count to also be low. If the search query is not popular, for example based on a small number of clicks for the search query, then the hover weighting may be one or approximately one, causing the adjusted hover count to be approximately equal to the actual hover count.

A total hover count for the search query is determined (510). This hover count can be based on the hover count for each image search result that was hovered over when provided for the search query. To illustrate, consider a search query for which twenty images were hovered at least once when provided in response to the search query. The search system 110 can determine the number of times that each of the twenty images was hovered when provided for the search query and sum these numbers to determine the total hover count.

The total hover count for the search query is adjusted to produce an adjusted total hover count (512). In some implementations, the total hover count is adjusted using the hover weighting determined above for the image and search query pair. For example, the search system 110 may multiply the total hover count for the search query by the hover weighting to determine the adjusted total hover count.

A total selection count for the search query is determined using the total click count for the search query and the adjusted total hover count for the search query. For example, the search system 110 may determine the total selection count for the search query by summing the total click count for the search query and the adjusted hover count for the search query.

A quality measure is determined for the image with respect to the search query (516). In some implementations, the search system 110 determines the quality measure using the total selection count for the image and search query pair and the total selection count for the search query. For example, the search system 110 may determine the quality measure for the image based on a ratio of the total selection count for the image and search query pair to the total selection count for the search query.

In some implementations, the search system 110 provides the total selection count for the image and search query pair and the total selection count for the search query to an image ranking or re-ranking process that determines the quality measure for the image and other images, and ranks the images, at least in part on the quality measures. For example, an image ranking process may rank the images based on relevance scores for the images. The image ranking process may provide the ranking to an image re-ranking process that determines the quality measures for the images and re-ranks the images based on the original ranking and the quality measures. For example, the image re-ranking process may multiply the relevance score for each image by the quality measure for the image to determine a rank score and re-rank the images based on the rank scores.

Figure 6:
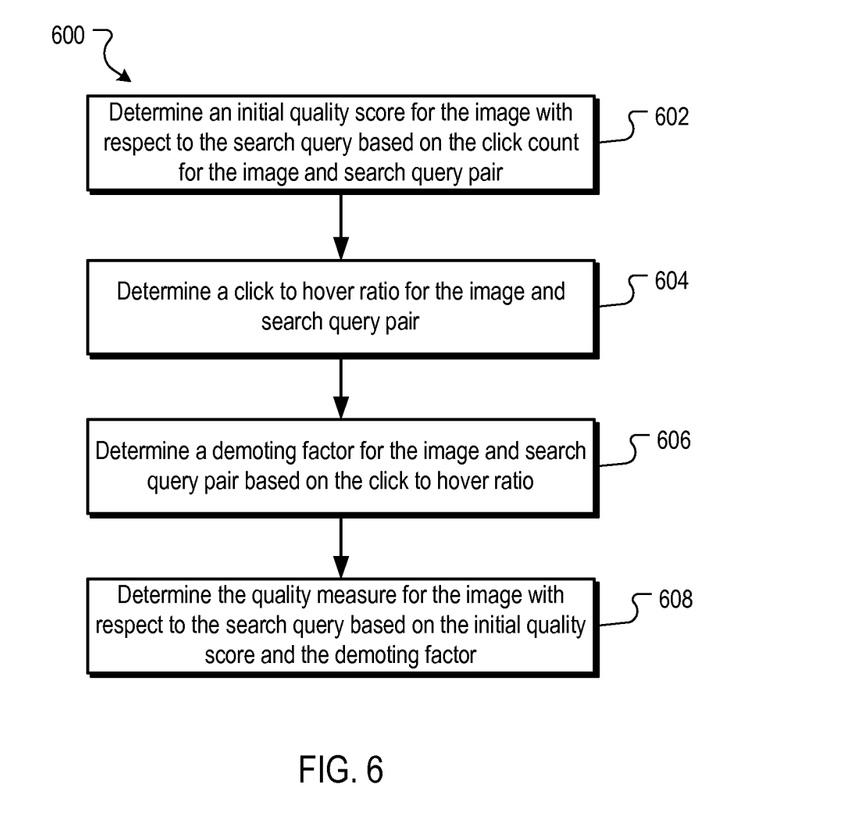
FIG. 6 is a flow chart of another example process for determining a quality measure for an image with respect to a search query.

FIG. 6 is a flow chart of another example process 600 for determining a quality measure for an image with respect to a search query. The process 600 can, for example, be implemented by the search system 110. The example process 600 utilizes a demoting factor to adjust an initial quality score for the image. For example, the initial quality score may be based on a click count for the image and search query pair and a total click count for the search query, such as a ratio of the two click counts.

In some implementations the demoting factor is based on a click to hover ratio for the image and search query pair. For example, the click to hover ratio may be determined by dividing the click count for the image and search query pair by the hover count for the image and search query pair. The click to hover ratio can be a very useful signal for demoting certain types of images, such as click magnet images that tend to be off-topic but attract users' attention. For example, a click magnet image may receive a large number of hovers from users that are drawn to the image. However, as the image may not be what the user was searching for, the image may not receive a large number of clicks, resulting in a small click to hover ratio.

An initial quality score is determined for the image with respect to the search query (602). In some implementations, the search system 110 determines the initial quality score based, in part, on a ratio of the click count for the image and search query pair and the total click count for the search query across all images that have been clicked for the search query. For example, the initial quality measure may be proportional to the product of this ratio and a relevance score for the image with respect to the search query.

A click to hover ratio is determined for the image and search query pair (604). For example, the search system 110 may determine the click to hover ratio by dividing the click count for the image and search query pair by the hover count for the image and search query pair.

A demoting factor is determined for the image and search query pair using the click to hover ratio (606). In some implementations, the search system 110 applies a sigmoid function to the click to hover ratio to determine the demoting factor. For example, Equation 3, shown below, may be used to determine the demoting factor.

$$\text{Demoting Factor} = \frac{1}{1 + e^{(-ax+b)}} \quad \text{Equation 3}$$

In Equation 3, "x" is the click to hover ratio for the image and search query pair, and the parameters "a" and "b" smoothing coefficients. The smoothing coefficients can be adjusted, for example to adjust the sigmoid function to generate a desirable demoting factor for particular click to hover ratios.

A quality measure is determined for the image with respect to the search query (608). In some implementations, the search system 110 determines the quality measure using the initial quality score and the demoting factor. For example, the quality measure may be proportional to the product of the initial quality score and the demoting factor. In some implementations, the minimum quality measure for the image is one. For example, the quality score measure may be determined using Equation 4 below.

$$\text{Quality Measure} = \max(1, iqs*df) \quad \text{Equation 4:}$$

In Equation 4, "iqs" is the initial quality score for the image with respect to the search query and "df" is the demoting factor for the image and search query pair. By limiting the minimum quality measure to one, the rank score for the image won't be reduced to a value less than the image's relevance score as a result of multiplying the relevance score by the quality measure. Thus, relevant images may not be unfairly penalized for having a low click to hover ratio.

Figure 7:
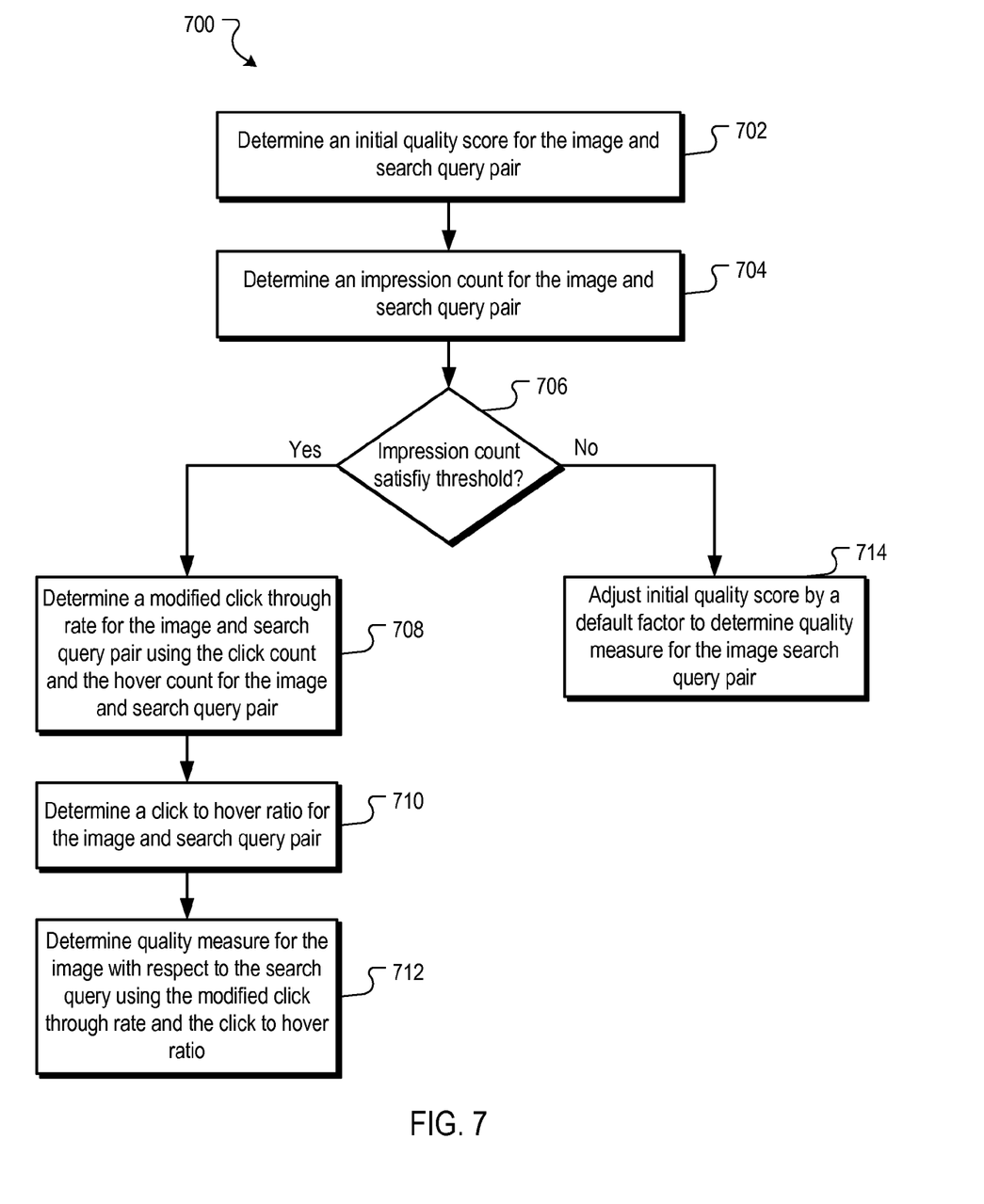
FIG. 7 is a flow chart of another example process for determining a quality measure for an image with respect to a search query.

FIG. 7 is a flow chart of another example process 700 for determining a quality measure for an image with respect to a search query. The process 700 can, for example, be implemented by the search system 110.

An initial quality score is determined for the image with respect to the search query (702). In some implementations, the search system 110 determines the initial quality score based, in part, on a ratio of the click count for the image and search query pair and the total click count for the search query across all images that have been clicked for the search query.

An impression count is determined for the image and search query pair (704). The impression count is the number of times that the image has been presented in the form of a search result to users in response to the search query.

A determination is made whether the impression count satisfies a threshold (706). For example, the search system 110 may compare the impression count to a threshold, such as zero or another number. In some implementations, the impression count satisfies the threshold when the impression count exceeds the threshold. If it is determined that the impression count satisfies the threshold, the quality measure is determined based on the initial quality score, a click through rate for the image and search query pair, and a click to hover ratio for the image and search query pair (708-712), as described below.

If it is determined that the impression count does not satisfy the threshold, the quality measure is determined based on an initial quality score and a default factor (714). For example, the impression count may not satisfy the threshold when the impression count does not exceed the threshold. The default factor can be used for images that have not been provided for the search query as there may not be data to compute a click through rate or click to hover ratio for the image and search query. This default factor can be any number and can be set, for example, by a system designer or system administrator. The default factor can be set based on a desired rank for images that have not been previously provided for the search query. For example, a higher default factor can be used to promote new images or other images that have not yet been provided for the search query.

A modified click through rate is determined for the image and search query pair using the click count for the image and search query pair and the hover count for the image and search query pair (708). For example, the search system 110 may determine the click count and hover count using the historical data 114 and, in turn, determine the modified click through rate. In some implementations, the modified click though rate is determined using Equation 5 below.

$$CTR = \frac{C+H}{I} \quad \text{Equation 5}$$

In Equation 5, "CTR" is the modified click through rate, "C" is the click count, "H" is the hover count, and "I" is the impression count for the image and search query pair.

A click to hover ratio is determined for the image and search query pair (710). For example, the search system 110 may determine the click to hover ratio using the click count and hover count for the image and search query pair. In some implementations, the click to hover ratio is determined using Equation 6 below.

$$CHR = \frac{(C+1)}{(H+1)} \quad \text{Equation 6}$$

In Equation 6, "CHR" is the click to hover ratio, "C" is the click count and "H" is the hover count for the image and search query pair.

The quality measure is determined for the image with respect to the search query using the modified click through rate and the click to hover ratio (712). In some implementations, the quality measure is based on the modified click through rate, the click to hover ratio, and the initial quality score. For example, the quality measure may be proportional to a product of the modified click through rate, the click to hover ratio, and the initial quality score. Smoothing coefficients and/or other parameters also may be used to determine the quality measure. For example, the quality measure may be determined using Equation 7 below.

$$\text{Quality Measure} = iqs * A * (CTR^m * CHR^n)^k \quad \text{Equation 7:}$$

In Equation 7, "iqs" is the initial quality score, "A" is an adjustable parameter, "CTR" is the modified click through rate, "CHR" is the click to hover ratio, and the parameters "m," "n," and "k" are smoothing coefficients. The parameter "A" can be used to scale the quality measure to a value closer to one, or closer to another value.

In some implementations, the parameters "m," "n," and "k" have a predefined or adjustable value for adjusting the quality measure to meet an image ranking metric. The parameter "m" can be used to weight the modified click through rate. For example, a higher "m" can be used to more heavily penalize images having a low click through rate.

Similarly, the parameter "n" can be used to weight the click to hover ratio. For example, a higher "n" can be used to more heavily penalize images that receive a large number of hovers relative to the number of clicks.

The parameter "k" can be used to weight the product of the modified click through rate and the click to hover ratio. A higher "k" gives the modified click through rate and the click to hover ratio more influence on the quality measure relative to the initial quality score.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of this document or of what may be claimed, but rather as descriptions of features specific to particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying a click count for an image and a search query pair, the click count being based on a number of times that an image search result that includes a representation of the image has been selected when provided in response to the search query;
   identifying a hover count for the image and the search query pair, the hover count being based on a number of times that the representation of the image has been hovered over by a pointer when the image search result has been provided in response to the search query;
   adjusting the hover count using a hover weighting to determine an adjusted hover count, the hover weighting being based on a total click count for the search query;
   determining a quality measure for the image with respect to the search query, the quality measure being based at least on the click count and the adjusted hover count;
   ranking the image relative to a plurality of images for the search query based at least in part on the quality measure for the image;
   selecting one or more images from a set of images that includes the image and the plurality of images based on the ranking, wherein each particular image in the set of images is ranked based on a respective quality measure for the particular image;
   generating search results that reference the one or more images; and
   transmitting the search results for presentation.

2. The method of claim 1, wherein the hover weighting is inversely proportional to the total click count.

3. The method of claim 1, wherein determining the quality measure for the image comprises:
   identifying a query hover count for the search query, the query hover count specifying a total number of hovers for image and search query pairs that include the search query as a member;
   adjusting the query hover count using the hover weighting to generate an adjusted query hover count;
   determining a total query selection count for the search query based on the adjusted query hover count and the total click count;
   determining a total image selection count for the image based on the click count and the adjusted hover count; and
   determining the quality measure for the image based on the total image selection count and the total query selection count.

4. The method of claim 1, wherein the total click count for the search query comprises a total number of selections of image search results provided in response to the search query.

5. The method of claim 1, wherein the quality measure is based on a click to hover ratio for the image and search query pair, the click to hover ratio being a ratio between the click count for the image and search query pair and the hover count for the image and search query pair.

6. The method of claim 1, wherein determining the hover weighting comprises applying a sigmoid function to the total click count for the search query.

7. A system comprising:
   a data processing apparatus; and
   a memory storage apparatus in data communication with the data processing apparatus, the memory storage apparatus storing instructions executable by the data processing apparatus and that upon such execution cause the data processing apparatus to perform operations comprising:
   identifying a click count for an image and a search query pair, the click count being based on a number of times that an image search result that includes a representation of the image has been selected when provided in response to the search query;
   identifying a hover count for the image and the search query pair, the hover count being based on a number of times that the representation of the image has been hovered over by a pointer when the image search result has been provided in response to the search query;
   adjusting the hover count using a hover weighting to determine an adjusted hover count, the hover weighting being based on a total click count for the search query;
   determining a quality measure for the image with respect to the search query, the quality measure being based at least on the click count and the adjusted hover count;
   ranking the image relative to a plurality of images for the search query based at least in part on the quality measure for the image;
   selecting one or more images from a set of images that includes the image and the plurality of images based on the ranking, wherein each particular image in the set of images is ranked based on a respective quality measure for the particular image;
   generating search results that reference the one or more images; and
   transmitting the search results for presentation.

8. The system of claim 7, wherein the hover weighting is inversely proportional to the total click count.

9. The system of claim 7, wherein determining the quality measure for the image comprises:
   identifying a query hover count for the search query, the query hover count specifying a total number of hovers for image and search query pairs that include the search query as a member;
   adjusting the query hover count using the hover weighting to generate an adjusted query hover count;
   determining a total query selection count for the search query based on the adjusted query hover count and the total click count;
   determining a total image selection count for the image based on the click count and the adjusted hover count; and
   determining the quality measure for the image based on the total image selection count and the total query selection count.

10. The system of claim 7, wherein the total click count for the search query comprises a total number of selections of image search results provided in response to the search query.

11. The system of claim 7, wherein the quality measure is based on a click to hover ratio for the image and search query pair, the click to hover ratio being a ratio between the click count for the image and search query pair and the hover count for the image and search query pair.

12. The system of claim 7, wherein determining the hover weighting comprises applying a sigmoid function to the total click count for the search query.

13. A non-transitory computer storage device encoded with a computer program, the program comprising instructions that when executed by data processing apparatus cause the data processing apparatus to perform operations comprising:

identifying a click count for an image and a search query pair, the click count being based on a number of times that an image search result that includes a representation of the image has been selected when provided in response to the search query;

identifying a hover count for the image and the search query pair, the hover count being based on a number of times that the representation of the image has been hovered over by a pointer when the image search result has been provided in response to the search query;

adjusting the hover count using a hover weighting to determine an adjusted hover count, the hover weighting being based on a total click count for the search query;

determining a quality measure for the image with respect to the search query, the quality measure being based at least on the click count and the adjusted hover count;

ranking the image relative to a plurality of images for the search query based at least in part on the quality measure for the image;

selecting one or more images from a set of images that includes the image and the plurality of images based on the ranking, wherein each particular image in the set of images is ranked based on a respective quality measure for the particular image;

generating search results that reference the one or more images; and transmitting the search results for presentation.

14. The non-transitory computer storage device of claim 13, wherein the hover weighting is inversely proportional to the total click count.

15. The non-transitory computer storage device of claim 13, wherein determining the quality measure for the image comprises:

identifying a query hover count for the search query, the query hover count specifying a total number of hovers for image and search query pairs that include the search query as a member;

adjusting the query hover count using the hover weighting to generate an adjusted query hover count;

determining a total query selection count for the search query based on the adjusted query hover count and the total click count;

determining a total image selection count for the image based on the click count and the adjusted hover count; and determining the quality measure for the image based on the total image selection count and the total query selection count.

16. The non-transitory computer storage device of claim 13, wherein the total click count for the search query comprises a total number of selections of image search results provided in response to the search query.

17. The non-transitory computer storage device of claim 13, wherein the quality measure is based on a click to hover ratio for the image and search query pair, the click to hover ratio being a ratio between the click count for the image and search query pair and the hover count for the image and search query pair.

18. The non-transitory computer storage device of claim 13, wherein determining the hover weighting comprises applying a sigmoid function to the total click count for the search query.

* * * * *